US008625466B2

(12) United States Patent
Miller (10) Patent No.: US 8,625,466 B2
(45) Date of Patent: Jan. 7, 2014

(54) MULTI-CARD NETWORK DEVICE APPEARING AS SINGLE ENTITY IN SPANNING TREE NETWORK

(75) Inventor: Ronald D. Miller, Sausalito, CA (US)

(73) Assignee: Calix, Inc., Petaluma, CA (US)

(*) Notice: Subject to any disclaimer, the term of this patent is extended or adjusted under 35 U.S.C. 154(b) by 713 days.

(21) Appl. No.: 12/777,832

(22) Filed: May 11, 2010

(65) Prior Publication Data

US 2011/0280159 A1    Nov. 17, 2011

(51) Int. Cl.
*H04L 12/28* (2006.01)
(52) U.S. Cl.
USPC ............................ 370/256; 370/254; 370/255
(58) Field of Classification Search
None
See application file for complete search history.

(56) References Cited

U.S. PATENT DOCUMENTS

| 7,911,981 | B2* | 3/2011 | Park et al. | 370/256 |
| 8,259,569 | B2* | 9/2012 | Banerjee et al. | 370/230 |
| 2006/0268749 | A1* | 11/2006 | Rahman et al. | 370/256 |
| 2009/0168671 | A1 | 7/2009 | Holness et al. | |

OTHER PUBLICATIONS

IEEE Std 802.1D, IEEE Standard for Local and metropolitan area networks, Media Access Control (MAC) Bridges, Jun. 9, 2004, 281 pages.
G.S. Antonova, "Spanning Tree Protocol Interoperability with Other Loop Prevention Algorithms," IEEE, 2007, pp. 1098-1101.
IEEE Standard for Local and metropolitan area networks, Media Access Control (MAC) Bridges, Amendment 1: Bridging of IEEE 802.17, IEEE Std 802.17a-2004, Oct. 29, 2004, 11 pages.
U.S. Appl. No. 12/692,091, filed Jan. 22, 2010, Miller et al.

* cited by examiner

*Primary Examiner* — Hassan Phillips
*Assistant Examiner* — Mark A Mais
(74) *Attorney, Agent, or Firm* — Shumaker & Sieffert, P.A.

(57) ABSTRACT

Techniques are disclosed that may allow a network device comprising multiple line cards that are each executing a spanning tree algorithm to appear as a single spanning tree protocol entity to other network devices within a bridged local area network (LAN). In one example, a method includes determining, via a first processor on a first card of a network device, a first superior local port on the first card, transmitting, from the first card to a second card of the network device, a data unit specifying the determined first superior local port, and determining, via a second processor on the second card, a superior port on the network device among the first superior local port and a second plurality of ports on the second card based on a second plurality of BPDUs received via the second plurality of ports.

36 Claims, 6 Drawing Sheets

MULTI-CARD NETWORK DEVICE APPEARING AS SINGLE ENTITY IN SPANNING TREE NETWORK

TECHNICAL FIELD

The disclosure relates to computer networks and, more particularly, to layer two computer networks utilizing spanning tree protocol.

BACKGROUND

A computer network, e.g., a local area network (LAN), is a collection of interconnected computing devices that can exchange data and share resources. It is often desirable to divide a LAN into multiple segments in order to improve the performance of the LAN. Certain devices, such as layer 2 network devices, e.g., switches or bridges, may be used to interconnect LAN segments to one another. Such devices may improve the performance of the LAN by preventing packets that are not destined for devices on a particular segment from being forwarded to that segment.

In addition to improving the performance of a LAN, the layer 2 network devices interconnecting LAN segments provide redundant pathways within the LAN. That is, the interconnection of the layer 2 network devices creates multiple pathways for packets to traverse the network. This redundancy is desirable in the event that one of the layer 2 devices becomes inactive, e.g., a device is taken out of service or otherwise becomes inoperative, thereby allowing another active link to carry packets between LAN segments. However, by providing redundancy, i.e., multiple pathways between LAN segments, unwanted loops may be created within the LAN.

In order to break loops created within the LAN, the layer 2 network devices interconnecting the LAN segments may logically block one or more of their ports. In order to determine which ports to logically block, the layer 2 network devices interconnecting the LAN segments execute a spanning tree algorithm defined by a spanning tree protocol, e.g., a spanning tree protocol or rapid spanning tree protocol. A network administrator, for example, assigns a cost, or "path cost," to each port on each layer 2 network device interconnecting the LAN segments. A path cost is the cost of a link on the spanning tree network that terminates a given port. For example, if a first link is further away from a root bridge than a second link, the first link may be assigned a higher path cost. Also, the technology of the link may be factored into the cost. For example, a link that is optical fiber may have a lower cost than a link that is copper, due to the generally faster transmission rates of optical fiber. In this manner, a cost is associated with each spanning tree link. The spanning tree protocol uses a spanning tree algorithm to determine which port(s) to logically block based on the associated path cost.

SUMMARY

In general, this disclosure describes techniques that may allow a network device comprising multiple line cards (or "cards") that are each executing a spanning tree algorithm to appear as a single spanning tree protocol entity to other network devices within a bridged local area network (LAN). Each of these multiple line cards may operate an instance of the spanning tree algorithm in order to manage only the ports located directly on that card. By distributing the spanning tree processing across multiple line cards, network scalability may be improved as the quantity of ports that are supported increases.

In one example, the disclosure is directed to a method that comprises determining, via a first processor executing a first instance of a spanning tree protocol on a first card of a network device, a first superior local port among a first plurality of ports on the first card based on a first plurality of bridge protocol data units (BPDUs) received via the first plurality of ports, transmitting, from the first card to a second card of the network device, a data unit specifying the determined first superior local port among the first plurality of ports, and determining, via a second processor executing a second instance of the spanning tree protocol on the second card, a superior port on the network device among the first superior local port and a second plurality of ports on the second card based on a second plurality of BPDUs received via the second plurality of ports.

In another example, the disclosure is directed to a network device comprising a first processor, executing a first instance of a spanning tree protocol on a first card of the network device, configured to determine a first superior local port among a first plurality of ports on the first card based on a first plurality of bridge protocol data units (BPDUs) received via the first plurality of ports, and transmit, from the first card to a second card of the network device, a data unit specifying the determined first superior local port among the first plurality of ports. The network device further comprises a second processor, executing a second instance of the spanning tree protocol on a second card of the network device, configured to determine a superior port on the network device among the first superior local port and a second plurality of ports on the second card based on a second plurality of BPDUs received via the second plurality of ports.

In another example, the disclosure is directed to a computer-readable storage medium comprising instructions that, when executed, cause a first processor to determine, by executing a first instance of a spanning tree protocol on a first card of a network device, a first superior local port among a first plurality of ports on the first card based on a first plurality of bridge protocol data units (BPDUs) received via the first plurality of ports, and transmit, from the first card to a second card of the network device, a data unit specifying the determined first superior local port among the first plurality of ports. The instructions, when executed, cause a second processor to determine, by executing a second instance of the spanning tree protocol on the second card, a superior port on the network device among the first superior local port and a second plurality of ports on the second card based on a second plurality of BPDUs received via the second plurality of ports.

In another example, the disclosure is directed to a network device comprising means for determining a first superior local port among a first plurality of ports on a first card of a network device based on a first plurality of bridge protocol data units (BPDUs) received via the first plurality of ports, means for transmitting, from the first card to a second card of the network device, a data unit specifying the determined first superior local port among the first plurality of ports, and means for determining a superior port on the network device among the first superior local port and a second plurality of ports on the second card based on a second plurality of BPDUs received via the second plurality of ports.

The details of one or more aspects of the disclosure are set forth in the accompanying drawings and the description below. Other features, objects, and advantages will be apparent from the description and drawings, and from the claims.

DETAILED DESCRIPTION

Figure 1:
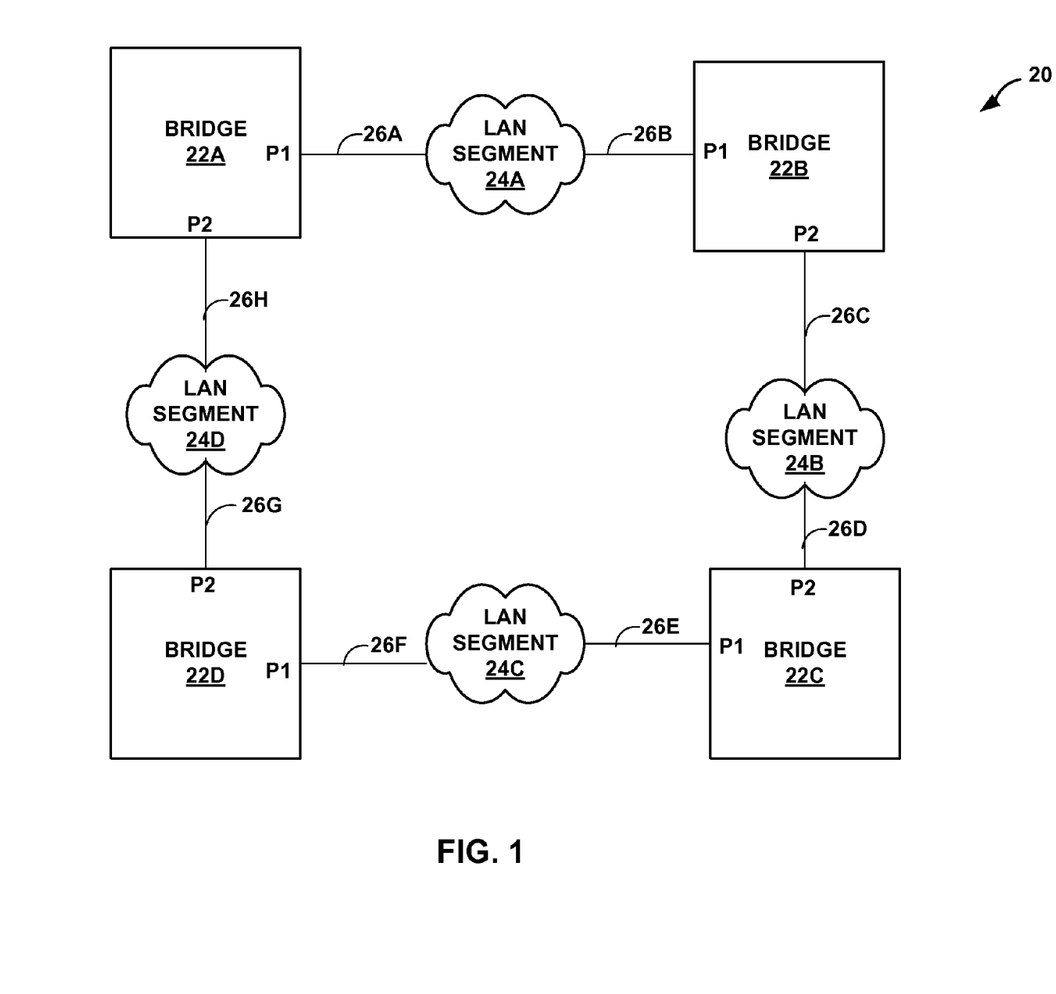
FIG. 1 is a block diagram illustrating an example computer network.

FIG. 1 is a block diagram illustrating an example computer network. Computer network 20 in FIG. 1 represents an example bridged local area network (LAN). In some examples, network 20 may implement Ethernet networking techniques. In this case, network 20 may be an Ethernet network. Network 20 includes four nodes 22A-22D. In this particular example, nodes 22A-22D are Media Access Control (MAC) bridges. MAC bridges 22A-22D (collectively referred to in this disclosure as "bridges 22") that interconnect four LAN segments 24A-24D (collectively referred to in this disclosure as "LAN segments 24"). Although referred to throughout this disclosure as bridges, bridges 22 may represent other layer 2 network devices, such as switches. Bridges 22 connect respective LAN segments 24 via links 26. For example, LAN segment 24A is connected to LAN segment 24D through bridge 22A via link 26A and link 26H. Similarly, LAN segment 24A is connected to LAN segment 24B through bridge 22B via link 26B and link 26C, and so forth. In this manner, the various LAN segments 24 of network 20 are interconnected via bridges 22.

Interconnecting LAN segments 24 via bridges 22 may improve the overall performance network 20 by reducing collisions, for example. In addition to improving the performance of a LAN, bridges 22 provide redundant pathways within the LAN. That is, the bridges 22 create multiple pathways for packets to traverse the network. For example, using a first pathway, a packet transmitted from LAN segment 24A to LAN segment 24B may traverse link 26B to bridge 22B and bridge 22B may forward the packet to LAN segment 24B. Using a second pathway, a packet transmitted from LAN segment 24A to LAN segment 24B may traverse link 26H to LAN segment 24D, then traverse link 26G to bridge 22D, and so forth until the packet reaches LAN segment 24B. This redundancy is desirable in case one of bridges 22 or one of links 26 becomes inactive, e.g., a bridge 22 is taken out of service or a link 26 is compromised, thereby allowing other active links and/or devices to carry packets between LAN segments. However, by providing redundancy, i.e., multiple pathways between LAN segments, unwanted loops are created within the LAN. If none of bridges 22 detects that data is looping the network, each bridge may continue to forward the traffic endlessly, thereby establishing a traffic loop, which may substantially impact the performance of the network by needlessly consuming network resources, such as bridge processing time and memory as well as link bandwidth.

In order to break loops created within the LAN, each one of bridges 22 may execute a spanning tree algorithm defined by a spanning tree protocol, e.g., Spanning Tree Protocol and Rapid Spanning Tree Protocol, in order to determine which of their ports to logically block. That is, a block is placed within a data path to prevent a loop. A network administrator, for example, assigns a cost, or "path cost," to each port on each bridge 22 interconnecting LAN segments 24. A path cost is the cost of a link 26 on the spanning tree network that terminates a given port.

In order to assign path costs, one of bridges 22 is selected as the root bridge for the network. Each of bridges 22 is assigned a bridge identifier (ID). The bridge ID includes two numbers: a Media Access Control (MAC) address and a bridge priority. The bridge priority is a programmable value that a network administrator may use to force the spanning tree algorithm to select one bridge as the root bridge. A processor of each of bridges 22 encapsulates that particular bridge's bridge ID, along with various other information (described in more detail below) in a bridge protocol data unit (BPDU). Each bridge transmits these BPDUs through network 20, thereby allowing each of bridges 22 to exchange spanning tree information and determine or select a root bridge for the network.

Upon receiving the BPDUs, a processor executing the spanning tree algorithm of each of bridges 22 decapsulates the BPDUs and compares the bridge IDs for each of bridges 22. The bridge with the lowest bridge priority is selected as the root bridge. In the event that there are two or more bridges with the same bridge priority, the MAC addresses of these bridges are compared and the bridge with the lowest MAC address (there will be a lowest MAC address as these are unique addresses) is selected as the root bridge.

Once a root bridge is selected, a processor of each of bridges 22 determines a path cost back to the root bridge using a spanning tree algorithm. Referring again to FIG. 1, assume that bridge 22A has the lowest bridge priority and, as such, has been selected as the root bridge for network 20. Each of bridges 22B-22D determines a path cost back to bridge 22A, the root bridge. If a first link 26 is further away from root bridge 22A than a second link 26, the first link 26 may be assigned a higher path cost. In addition, the technology of the link may be factored into the cost. For example, a link that is optical fiber may have a lower cost than a link that is copper, due to the generally faster transmission rates of fiber. In this manner, a cost is associated with each spanning tree link 26.

Each port on a bridge is assigned a port identifier (ID). The port on the bridge that connects to the lowest-cost path to the root bridge is the root port or the "superior" port. For example, assume that the lowest-cost path for bridge 22C back to root bridge 22A is via the port with port ID 1 of bridge 22C, labeled "P1" in FIG. 1. Port 1 of bridge 22C is designated as a root port, or "superior" port. In this manner, each bridge 22 on network 20 determines a superior port.

If a loop exists in the spanning tree network, a port on one of the bridges should be blocked in order to break the loop. The block is made at the point that is furthest away (in terms of "cost to root") from the root bridge. One algorithm for blocking ports is described as follows. A block is made when there is a link between two bridges in which neither bridge has selected that link's port to be the root port. That is, on each of the two bridges, some other port on each bridge has been selected as the root port. This identifies that link as being the furthest away (in terms of "cost to root") from the root bridge, and thus the point that a block shall be made.

On the two bridges that are connected via this undesired link, the bridge that has the lower "cost to root" of the two should leave its port as "forwarding" and the other bridge should set its port to "blocking" For example, in the example above, port 1 of bridge 22C was determined to be the root port for bridge 22C. Further assume that port 1 of bridge 22B was determined to be the root port for bridge 22B. If link 26C connected to port 2 (labeled "P2") of bridge 22B has a lower cost to root than link 26D connected to port 2 (labeled "P2") of bridge 22CB, port 2 of bridge 22B is set to "forwarding" and port 2 of bridge 22C is set to "blocking" If both bridges have the same "cost to root," then a tiebreaker is used. In a first tiebreaker, the bridge with the lower bridge ID should set its port to "forwarding" and the other bridge should set its port to "blocking."

In the case where two ports on the same bridge are connected to each other, then the first tiebreaker does not resolve the situation. In this case, the port with the lower port ID should be set to "forwarding" and the other port should be set to "blocking" In this manner, a spanning tree algorithm operating on each of bridges 22 determines a root bridge and, as appropriate, determines which ports on bridges 22 should be set to forwarding or blocking states to allow data traffic and prevent looping.

Figure 2:
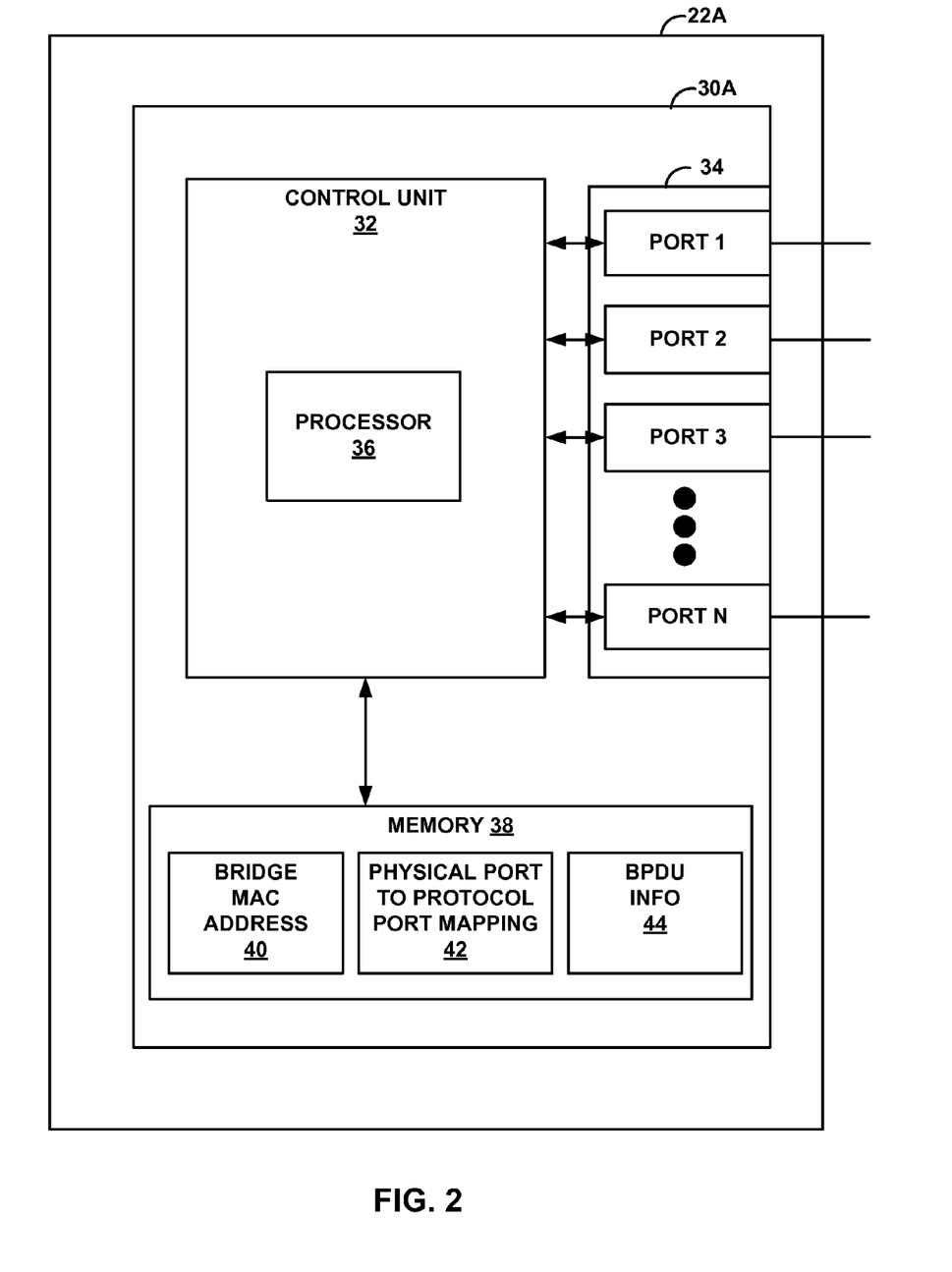
FIG. 2 is a block diagram illustrating an example network device comprising a line card that may be used to implement techniques of this disclosure.

FIG. 2 is a block diagram illustrating an example network device comprising a line card that may be used to implement techniques of this disclosure. Although FIG. 2 depicts MAC bridge 22A of FIG. 1 specifically, MAC bridge 22A is considered representative of MAC bridges 22 in general, e.g., MAC bridges 22B-22D. Line card 30A, also referred to simply as a card, is a component of MAC bridge 22A that terminates a number N ports that provide connections to other network devices, e.g., other bridges 22, in bridged LAN 20. An example MAC bridge that may implement various techniques disclosed herein is the Calix E7 Ethernet Service Access Platform, commercially available from Calix, Inc., of Petaluma, Calif. Line card 30A includes control unit 32, which couples to interface module 34 and, in particular, a number N ports. Line card 30A and, in particular, control unit 32 implements an instance of a spanning tree algorithm. Control unit 32 may comprise one or more processors 36 that execute software instructions, such as those used to define a software or computer program, stored in a computer-readable storage medium such as memory 38 (e.g., a Flash memory, random access memory (RAM), or any other type of volatile or non-volatile memory that stores instructions), or a storage device (e.g., a disk drive, or an optical drive). Alternatively, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

In addition to software instructions, memory 38 also may store, for example, bridge MAC address 40, physical port to protocol port mapping 42 (described in more detail below), as well as BPDU information 44 (e.g., bridge priority, root identifier, etc.) used by processor 36 to generate BPDUs.

FIG. 2 depicts bridge 22A populated with a single line card 30A. Each line card 30A, however, is physically limited in the number of ports that it can accommodate. In addition, each processor 36, e.g., an Ethernet switching ASIC, of each line card 30A is limited in the number of ports that it can control. In order to provide higher port density, it may be desirable in some network implementations to include multiple line cards within bridge 22.

Figure 3:
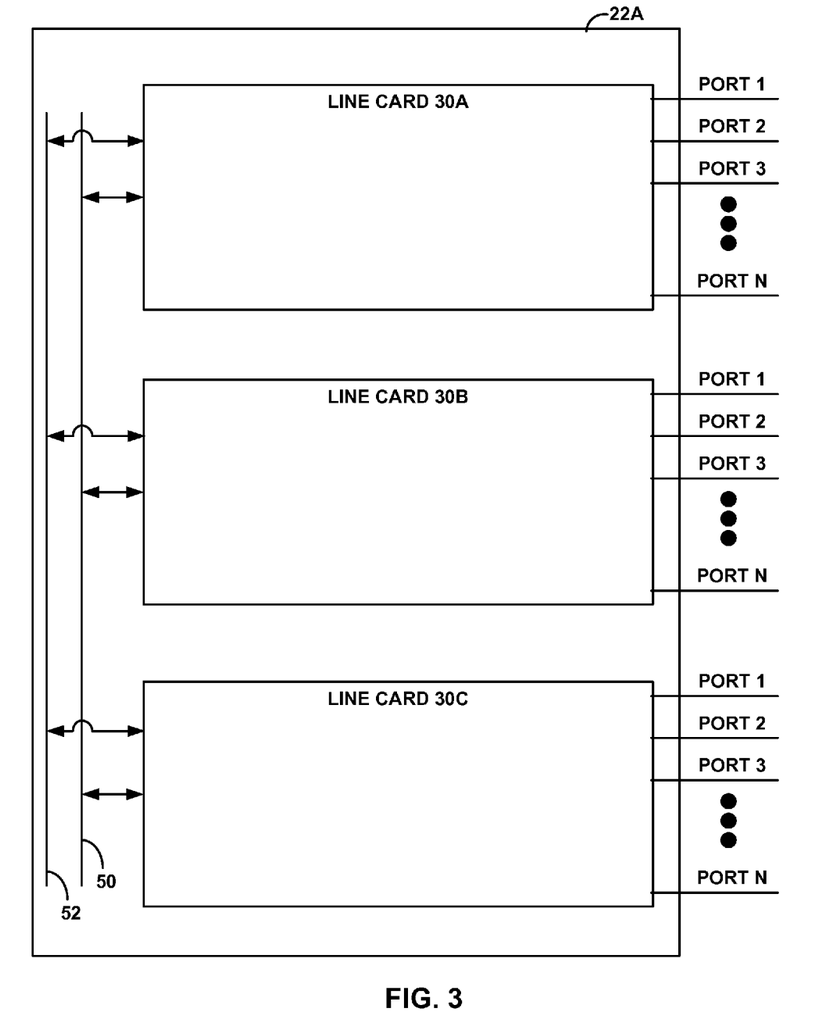
FIG. 3 is a block diagram illustrating the MAC bridge of FIG. 2 comprising multiple line cards.

FIG. 3 is a block diagram illustrating the MAC bridge of FIG. 2 comprising multiple line cards. It should be noted that FIG. 3 depicts only a portion of the components of MAC bridge 22A of FIG. 2 and is intended to illustrate the multiple ports on the multiple line cards and the connectivity between the multiple line cards. As seen in FIG. 3, two additional line cards, namely line cards 30B and 30C, have been included. As such, MAC bridge 22A of FIG. 3 includes three cards, namely line cards 30A-30C (collectively referred to as "line cards 30"). Each of line cards 30B and 30C is similar to line card 30A shown in greater detail in FIG. 2. As will be described in more detail below and in accordance with various techniques described in this disclosure, each of line cards 30A-30C may execute an instance of a spanning tree algorithm in order to manage the N ports on that particular line card. That is, a processor on line card 30A executes a first instance of a spanning tree algorithm, a processor on line card 30B executes a second instance of the spanning tree algorithm, and a processor on line card 30C executes a third instance of the spanning tree algorithm. Information generated by these separately running instances of the spanning tree algorithm is communicated between the multiple line cards 30 of MAC bridge 22. Using the techniques of this disclosure, two or more of the line cards, e.g., line cards 30A-30C, generate one superior port for a network device, e.g., MAC bridge 22.

One advantage that may be provided by such techniques, in some examples, is the logical association between line cards 30A-30C. In some examples, this may allow spanning tree computations to be distributed across all of the line cards in a network device, thereby reducing the computational complexity of spanning tree computations and improving scalability as more line cards are added. In addition, the logical association between line cards in the network device may allow the line cards that are each executing a spanning tree algorithm to appear to other networking devices in network 20 as a single spanning tree entity. Network management may be significantly simplified by MAC bridge 22 appearing as a single spanning tree entity.

Referring again to FIG. 3, each of line cards 30A-30C terminate N ports, e.g., 10 ports. Although FIG. 3 depicts MAC bridge 22 comprising three line cards, in some example implementations, MAC bridge 22 may comprise only two line cards, e.g., line cards 30A and 30B, as will be described in more detail below. In other example implementations, MAC bridge 22 may include more than three line cards.

MAC bridge 22A interconnects multiple line cards 30, e.g., line cards 30A-30C, via data plane 50. Data plane 50 allows data plane traffic to travel between each of line cards 30 within the bridge. In addition, MAC bridge 22 interconnects multiple line cards 30 via management communications channel 52. Management communications channel 52 allows spanning tree protocol information generated via one line card, e.g., line card 30A, to travel between one or more other line cards within MAC bridge 22, e.g., line cards 30B and 30C. Similarly, management communications channel 52 allows spanning tree protocol information generated via line card 30B to travel to line cards 30A and 30C, and spanning tree protocol information generated via line card 30C to travel to line cards 30A and 30B. Line cards 30A-30C, using the techniques of this disclosure, generate one superior port for MAC bridge 22 based on the spanning tree protocol information that is transmitted between the line cards.

As described above, a spanning tree algorithm determines which of the ports associated with a bridge is the superior port and, in order to avoid a routing loop, the spanning tree algorithm determines which, if any, of the remaining ports must be blocked. When there are multiple line cards in a MAC bridge, e.g., line cards 30A-30C of MAC bridge 22, that are each executing their own instance of the spanning tree algorithm, a superior port is determined for each line card rather than a single superior port for the network device, e.g., MAC bridge 22A. However, in order for the MAC bridge, e.g., MAC bridge 22A, to appear as single spanning tree entity to other networking devices, one superior port for the MAC bridge must be determined from amongst the multiple superior ports, and the line cards, e.g., line cards 30A-30C must determine which, if any, of the remaining ports must be blocked in order to avoid a routing loop.

For example, in the configuration depicted in FIG. 3, line card 30A, executing a first instance of a spanning tree algorithm determines a first superior port for line card 30A, e.g., port 1, based on BPDUs received via ports 1-N of line card 30A. This first superior port will also be referred to as a first superior local port because it is specific to line card 30A. Likewise, line card 30B, executing a second instance of the spanning tree algorithm determines a second superior port for line card 30B, e.g., port 2, based on BPDUs received via ports 1-N of line card 30B. This second superior port will also be referred to as a second superior local port because it is specific to line card 30B. Finally, line card 30C, executing a third instance of the spanning tree algorithm determines a third superior port for line card 30C, e.g., port 3, based on BPDUs received via ports 1-N of line card 30C. This third superior port will also be referred to as a third superior local port because it is specific to line card 30C. Line cards 30A-30C must determine a single superior port from amongst these three determined superior local ports, e.g., port 1 of line card 30A, port 2 of line card 30B, and port 3 of line card 30C, and then determine which, if any, of the remaining ports must be blocked in order to prevent routing loops (because all of the line cards share single data plane 50).

Using the techniques of this disclosure, a single superior port for a MAC bridge, e.g., MAC bridge 22, may be determined from amongst two or more superior local ports, as determined for two or more respective line cards 30, as follows. For the case of two line cards in a MAC bridge, assume that MAC bridge 22 of FIG. 3 includes only two line cards, namely line cards 30A and 30B. Line card 30A receives BPDUs on each of its ports, e.g., ports 1-N, from the other spanning tree entities on network 20. By executing a spanning tree algorithm defined by a spanning tree protocol, e.g., Spanning Tree Protocol as defined by IEEE 802.1D or Rapid Spanning Tree Protocol as defined by IEEE 802.1W, the entire contents of each being incorporated herein by reference, line card 30A, and in particular processor 36, determines or computes which of the received spanning tree BPDUs received via ports 1-N on line card 30A comprise the superior data. Line card 30A will periodically, e.g., at 2 second intervals, transmit the result of this spanning tree computation (referred to as "Best Local Port" data) to all of the other line cards within the MAC bridge, e.g., line card 30B, via management communications channel 52. It should be noted that if line card 30A is not receiving any incoming spanning tree BPDUs, or if all of the received spanning tree BPDU data has been "aged-out" with respect to the spanning tree algorithm, e.g., no new BPDU information has been received for 6 seconds, then line card 30A indicates that "Best Local Port" data is "None." The contents of the "Best Local Port" data that line card 30A transmits to line card 30B consists of information that had been received in the superior spanning tree BDPU, plus identification information that identifies the transmitting line card, such as line card number or line card MAC address. For example, assume that the first instance of the spanning tree algorithm executed on line card 30A determines that port 1 is the superior local port of line card 30A. Line card 30A will send, via management communications channel 52, Best Local Port data to line card 30B (the only other line card in the MAC bridge in this specific example) indicating the port number that has the Best Local Port data, e.g., port 1, and information identifying the line card, e.g., line card 30A. Because there are multiple cards, and thus multiple port 1's, the port ID may be modified, as described in more detail below.

Line card 30B receives the computed Best Local Port data, or a first superior local port, from line card 30A. Line card 30B presents line card 30A's computed Best Local Port information to the spanning tree algorithm being executed on line card 30B. Line card 30A's computed Best Local Port information is treated similar to spanning tree BPDU data is received in spanning tree BPDUs via ports that reside on line card 30B. Line card 30B, executing its own instance of the spanning tree algorithm, includes the information received from line card 30A as part of the spanning tree computation being executed on line card 30B in order to determine the relative superiority of the ports that reside on line card 30B and thus determine to which state, i.e., "forward" or "blocked," each port on line card 30B will be set.

Continuing the example above, line card 30B receives, via management communications channel 52, Best Local Port data from line card 30A indicating that port 1 of line card 30A is line card 30A's superior local port. Executing its own instance of the spanning tree algorithm, line card 30B has already determined or computed the superior data being received in spanning tree BPDUs received via the ports that reside on line card 30B. That is, line card 30B has already computes its own superior local port. For instance, line card 30B has determined that it is receiving superior data on its port 2. Line card 30B must determine whether port 1 of line card 30A is superior to port 2 on line card 30B, or whether line card 30B's superior local port, e.g., port 2, is superior to port 1 of line card 30A.

In some example implementations, line card 30B may input the Best Local Port information received from line card 30A into the spanning tree computation being executed on line card 30B via a "pseudo-port" input into the spanning tree computation. For example, assume that line card 30B includes 10 physical ("local") ports. Line card 30B designates, in this particular two line card example, one other port, e.g., port 11, as a pseudo-port (or "remote" port). The pseudo-port, port 11, is designated as "pseudo" because it is not associated with any of the ports that physically exist on line card 30B. Line card 30B inputs the Best Local Port information, or first superior local port, received from line card 30A into spanning tree computation via the pseudo-port, e.g., port 11, and the superior local data being received in spanning tree BPDUs received via the physical ports, e.g., ports 1 through 10, which reside on line card 30B. The spanning tree algorithm executing on line card 30B computes or determines an overall superior port for the network device from amongst the physical ports on line card 30B and the pseudo-port created. For instance, the spanning tree algorithm executing on line card 30B computes or determines an overall superior port for the network device, e.g., MAC bridge 22A, between port 1 of line card 30A, input via pseudo port 11 of line card 30B, and port 2 of line card 30B. In this manner, line card 30B determines the relative superiority of the ports that reside on line card 30B as compared to the previously determined Best Local Port of line card 30A. This determination allows line card 30B to further determine to which state, i.e., "forward" or "blocked," each port on line card 30B will be set. For instance, if line card 30B determines that port 1 of line card 30A is the overall superior port of the network device, then line card 30B recognizes that line card 30A will set port 1 of line card 30A to "forward," therefore line card 30B may be required to block some or all of its ports in order to prevent a routing loop. However, if line card 30B determines that port 2 of line card 30B is superior to port 1 of line card 30A, then line card 30B will set port 2 of line card 30B to "forward".

In the example above, line card 30B has determined the relative superiority of the ports that reside on line card 30B as compared to the previously determined Best Local Port of line card 30A in order to determine to which state its ports will be set. Line card 30A must also perform a computation similar to that described above. For purposes of conciseness, only some of the details provided above will be described again.

Line card 30B receives BPDUs on each of its ports, e.g., ports 1-N, from the other spanning tree entities on network 20. Line card 30B, and in particular processor 36, executes its own instance of spanning tree protocol and determines or computes which of the received spanning tree BPDUs received via ports 1-N on line card 30B comprise the Best Local Port data, or second superior local port. Line card 30B periodically transmits the Best Local Port data, i.e., second superior local port, to all of the other line cards within the MAC bridge, e.g., line card 30A, via management communications channel 52. For example, assume that the second instance of the spanning tree algorithm executed on line card 30B determines that port 2 is the superior local port of line card 30B. Line card 30B will send, via management communications channel 52, Best Local Port data to line card 30A (the only other line card in the MAC bridge in this specific example) indicating the port number that has the Best Local Port data, e.g., port 2, and information identifying the line card, e.g., line card 30B.

Line card 30A receives the computed Best Local Port data, i.e., second superior local port, from line card 30B. Line card 30B inputs the Best Local Port information received from line card 30B into the spanning tree computation being executed on line card 30A via a pseudo-port input. For example, assume that line card 30A includes 10 ports. Line card 30A designates, in this particular two line card example, one other port, e.g., port 11, as a pseudo-port. Line card 30B inputs the Best Local Port information received from line card 30B into the spanning tree computation via the pseudo-port, e.g., port 11, and the superior local data being received in spanning tree BPDUs received via the physical ports, e.g., ports 1 through 10, which reside on line card 30A. Line card 30A's spanning tree algorithm computes or determines an overall superior port for the network device, e.g., MAC bridge 22A, from amongst the physical ports on line card 30A and the pseudo-port created. In this manner, line card 30A determines the relative superiority of the ports that reside on line card 30A as compared to the previously determined Best Local Port of line card 30B. This determination allows line card 30A to further determine to which state, i.e., "forward" or "blocked," each port on line card 30A should be set. For instance, if line card 30A determines that port 1 of line card 30A is the overall superior port of the network device, then line card 30A will set its port 1 to "forward." However, if line card 30A determines that port 2 of line card 30B is superior to port 1 of line card 30A, then line card 30A recognizes that line card 30B will set port 2 of line card 30B to "forward," therefore line card 30A may be required to block some or all of its ports in order to prevent a routing loop. In this manner, line cards 30A and 30B each determine the relative superiority of the ports on line cards 30A and 30B in order to determine a single overall superior port for MAC bridge 22.

It should be noted that although the generation of Best Local Port data by line card 30A and the generation of Best Local Port by line card 30B was described sequentially, i.e., one before the other, the generation of Best Local Port data by line cards 30A and 30B (or all line cards in the case of more than two line cards) may, in some examples, be happening substantially in parallel with one another.

In the example described above, MAC bridge 22 included only two line cards. However, the techniques of this disclosure are not so limited. As described in detail below, the techniques of this disclosure are also applicable for MAC bridges that include three or more line cards.

Referring again to FIG. 3, MAC bridge 22A includes three line cards, namely line cards 30A-30C. MAC bridge 22A may include more than three line cards, but for purposes of conciseness, only three line cards will be described. As mentioned above, each of the three cards in MAC bridge 22A, e.g., line cards 30A-30C, determines or computes via a spanning tree algorithm the superior local data being received in spanning tree BPDUs via the ports that reside on the respective line card. That is, a processor, e.g., processor 36, of line card 30A, executes a first instance of a spanning tree protocol and determines a first superior local port from among a first plurality of ports on line card 30A based on a first plurality of BPDUs received via the first plurality of ports. Another processor, e.g., processor 36, of line card 30B, executes a second instance of the spanning tree protocol and determines a second superior local port from among a second plurality of ports on line card 30B based on a second plurality of BPDUs received via the second plurality of ports. Finally, another processor, e.g., processor 36, of line card 30C, executes a third instance of the spanning tree protocol and determines a third superior local port from among a third plurality of ports on line card 30C based on a third plurality of BPDUs received via the third plurality of ports.

Then, each line card of MAC bridge 22 transmits, via management communications channel 52, a data unit specifying the result, i.e., the Best Local Port data, of its respective spanning tree computation to all of the other line cards within the MAC bridge. The data units may be spanning tree BPDUs. For example, line card 30A transmits its computed Best Local Port data, e.g., port 1, to line cards 30B and 30C, line card 30B transmits its computed Best Local Port data, e.g., port 2, to line cards 30A and 30C, and line card 30C transmits its computed Best Local Port data, e.g., port 3, to line cards 30A and 30B.

In this manner, each line card collects Best Local Port data, or superior local ports, from all the other line cards within the MAC bridge. Line card 30A collects Best Local Port data from line card 30B and line card 30C and then determines which port on these other line cards has received superior spanning tree BPDU data. In other words, line card 30A determines whether the Best Local Port data received from line card 30B is superior to the Best Local Port data received from line card 30C or whether the Best Local Port data received from line card 30C is superior to the Best Local Port data received from line card 30B. For clarity, this result may be referred to as a superior "remote" port because this particular determined superior port is not local to line card 30A, the line unit making the determination. This determination utilizes a traditional "priority vector calculation" technique that is described in detail below with respect to FIG. 4. The relative superiority of line card 30A's ports are not involved in this determination.

For example, assume that line card 30A determines that the Best Local Port data received from line card 30B, e.g., port 2 of line card 30B, is superior to the Best Local Port data received from line card 30C, e.g., port 3 of line card 30C. In other words, line card 30A determines that port 2 of line card 30B is the superior remote port. The spanning tree algorithm on line card 30A will be presented, via a pseudo-port "on" line card 30A with the Best Local Port data of line card 30B, e.g., port 2, along with the spanning tree BPDU data that had been received directly from line card 30A's physical ports. Assuming that line card 30A has 10 physical ports, the spanning tree algorithm operating on line card 30A is presented with 11 inputs, namely the data of each of its 10 physical ports and the pseudo-port 11 on line card 30A, which is actually port 2 of line card 30B, i.e., the determined superior remote port. Assuming that amongst the physical ports of line card 30A that port 1 is the superior port, and assuming that port 1 of line card 30A is superior to port 2 of line card 30B, the spanning tree algorithm on line card 30A will compute that its port 1 will be set to the "forwarding" state.

This process is repeated on the remaining line cards, e.g., line cards 30B and 30C, of MAC bridge 22. Line card 30B collects Best Local Port data from line card 30A and line card 30C and then determines which port on these other line cards has received superior spanning tree BPDU data. In other words, line card 30B determines whether the Best Local Port data received from line card 30A is superior to the Best Local Port data received from line card 30C or whether the Best Local Port data received from line card 30C is superior to the Best Local Port data received from line card 30A. Again, this result may be referred to as a superior "remote" port because this particular determined superior port is not local to line card 30B, the line unit making the determination. The relative superiority of line card 30B's ports are not involved in this determination.

Assume that line card 30B determines that the Best Local Port data received from line card 30A, e.g., port 1 of line card 30A, is superior to the Best Local Port data received from line card 30C, e.g., port 3 of line card 30C. The spanning tree algorithm on line card 30B will be presented, via a pseudo-port "on" line card 30B with the Best Local Port data of line card 30A, e.g., port 1, along with the spanning tree BPDU data that had been received directly from line card 30B's physical ports. Assuming that line card 30B has 10 physical ports, the spanning tree algorithm operating on line card 30B is presented with 11 inputs, namely the data of each of its 10 physical ports and the pseudo-port 11 on line card 30B, which is actually port 1 of line card 30A, i.e., the determined superior remote port. Assuming that amongst the physical ports of line card 30B that port 2 is the superior port, and assuming that port 1 of line card 30A is superior to port 2 of line card 30B, the spanning tree algorithm on line card 30B will determine which of the ports on line card 30B must be set to "blocking" state in order to prevent a routing loop.

Finally, line card 30C collects Best Local Port data from line card 30A and line card 30B and then determines which port on these other line cards has received superior spanning tree BPDU data. In other words, line card 30C determines whether the Best Local Port data received from line card 30A is superior to the Best Local Port data received from line card 30B or whether the Best Local Port data received from line card 30A is superior to the Best Local Port data received from line card 30B. Again, this result may be referred to as a superior "remote" port because this particular determined superior port is not local to line card 30C, the line unit making the determination. The relative superiority of line card 30C's ports are not involved in this determination.

Assume that line card 30C determines that the Best Local Port data received from line card 30A, e.g., port 1 of line card 30A, is superior to the Best Local Port data received from line card 30B, e.g., port 2 of line card 30B. The spanning tree algorithm on line card 30C will be presented, via a pseudo-port "on" line card 30C with the Best Local Port data of line card 30A, e.g., port 1, along with the spanning tree BPDU data that had been received directly from line card 30C's physical ports. Assuming that line card 30C has 10 physical ports, the spanning tree algorithm operating on line card 30C is presented with 11 inputs, namely the data of each of its 10 physical ports and the pseudo-port 11 on line card 30C, which is actually port 1 of line card 30A, i.e., the determined superior remote port. Assuming that amongst the physical ports of line card 30C that port 3 is the superior port, and assuming that port 1 of line card 30A is superior to port 3 of line card 30C, the spanning tree algorithm on line card 30C will determine which of the ports on line card 30C must be set to "blocking" state in order to prevent a routing loop.

Using the techniques described throughout this disclosure, the multiple line cards on MAC bridge 22 may be able to determine a single overall superior port for the network device from amongst all of the ports on MAC bridge 22 in a fast, efficient, and computationally simple manner, thereby conserving processor resources. Rather than inputting the spanning tree BPDU data from ports 1-N on line card 30A, ports 1-N on line card 30B, and ports 1-N on line card 30C into a spanning tree algorithm operating on a single processor, which would be a computationally complex and resource intensive endeavor and which would become even more so as the number of line cards in a MAC bridge increased, the techniques of this disclosure distribute the spanning tree processing across all of the line cards within a MAC bridge. Each processor of a line card executes a spanning tree algorithm that performs a "pre-processing" determination or computation in order to determine Best Local Port data for that particular line card and each line card transmits the result of the computation, i.e., the Best Local Port data, to all of the other line cards. This "pre-processing" computation executed by each of the line cards aids in distributing the burden of the spanning tree computations across each line card, thereby simplifying and expediting the superior port determination for the MAC bridge and improving the scalability of the network device.

As described above, each bridge 22 is assigned a bridge identifier (ID). The bridge ID is the spanning tree term for the numeric value that each port on bridge 22 transmits, via a BPDU, to identify itself to other networking devices in network 20. The bridge ID includes two numbers: a Media Access Control (MAC) address and a bridge priority. The bridge priority is an administrable value that a network administrator may use to force the spanning tree algorithm to select one bridge as the root bridge. When MAC bridge 22A in FIG. 3 connects to another network device in network 20, e.g., MAC bridge 22B, each port on each line card of MAC bridge 22A transmits a BPDU to MAC bridge 22B. Each BPDU transmitted from MAC bridge 22A to MAC bridge 22B includes a bridge ID.

In order to facilitate the illusion that the multiple line cards within a MAC bridge, e.g., MAC bridge 22A, are a single line card, and thus ensure that the spanning tree BPDUs that are transmitted by each of the line cards will appear to a receiving network device, e.g., MAC bridge 22B, as being transmitted from the same MAC bridge, each line card should operate with the same bridge ID.

In one example implementation in accordance with this disclosure, this may be accomplished by designating the chassis MAC address as the bridge MAC address. By designating the chassis MAC address as the bridge MAC address, all of the line cards in a particular MAC bridge, e.g., MAC bridge 22A, present the same bridge ID to other networking devices on network 20, e.g., MAC bridges 22B-22D, thereby retaining the illusion that MAC bridge 22A is one network device and not a collection of network devices. Although the MAC addresses programmed into the separate line cards might not used to identify the MAC bridge to external networking devices, these MAC addresses can be used to allow the individual line cards within the MAC bridge to distinguish themselves from one another in internal messages. In other example implementations, a universally unique bridge ID may be, for example, a MAC address programmed into one of the line cards in the MAC bridge or a MAC address assigned by the network operator from a pool of unique MAC addresses.

In addition to the bridge ID, each BPDU transmitted includes a Protocol Port Identifier (or "Port Identifier"). The Port Identifier is the port number that a spanning tree algorithm uses to identify each port that it manages, and is the port number that is transmitted in a spanning tree BPDU. For example, a BPDU transmitted from port 1 of MAC bridge 22A includes a Port Identifier field that identifies port number 1 as the transmitting port. However, as seen in the example shown in FIG. 3, there may be multiple ports that may be identified as port 1, e.g., port 1 on line card 30A, port 1 on line card 30B, and port 1 on line card 30C. To eliminate the confusion, the particular line card on which the port resides should also be specified.

In accordance with techniques of this disclosure, in order to specify a particular line card and yet maintain the illusion that the multiple line cards are a single line card, many of the Port Identifiers of the MAC bridge should be renumbered or otherwise reassigned with different IDs. Within a MAC bridge, e.g., MAC bridge 22A, each line card should use a distinct range of Port Identifiers to ensure that there is no ambiguity or conflict with other line cards in the MAC bridge. For example, assume that each of line cards 30A-30C in FIG. 3 include 10 ports. A network administrator may assign ports 1-10 on line card 30A with Port Identifiers 1-10 (unchanged), ports 1-10 on line card 30B with Port Identifiers 11-20, and ports 1-10 on line card 30C with Port Identifiers 21-30. These distinct ranges of Port Identifiers permit a spanning tree algorithm to identify both a particular line card and port without having to modify a BPDU to include specific line card information. This also allows the MAC bridge to appear to other network devices on network 20 as a single spanning tree entity with 30 ports, rather than three line cards each having 10 ports.

It should be noted that certain actions can occur that cause the port that is currently in the "forwarding" state to no longer be able to carry traffic, meaning that the spanning tree algorithm on another line card might be required to change the state of a previously "blocked" port to become "forwarding." This should occur quickly, in order to minimize any disruption in traffic flow. Two such scenarios for which a fast reaction may be desired are disconnection or removal from service of the port that is currently "forwarding" and disconnection or removal of the line card upon which a currently "forwarding" port resides.

If the port that is currently "forwarding" is disconnected or removed from service, the "forwarding" port is no longer able to carry traffic. In this case, the line card upon which this port resides may immediately transmit updated "Best Local Port" data to all of the other line cards to allow the other line cards the opportunity for an immediate re-computing of which port shall be "forwarding."

If the line card upon which a currently "forwarding" port resides is disconnected or removed from service then the line card is no longer able to transmit any updated "Best Local Port" data. Therefore, a separate mechanism should be in place to inform the remaining line cards of the removal of a line card. When informed of the removal of a line card, each of the remaining line cards may treat that as if it had received a "Best Local Port=None" indication from the now missing line card.

Figure 4:
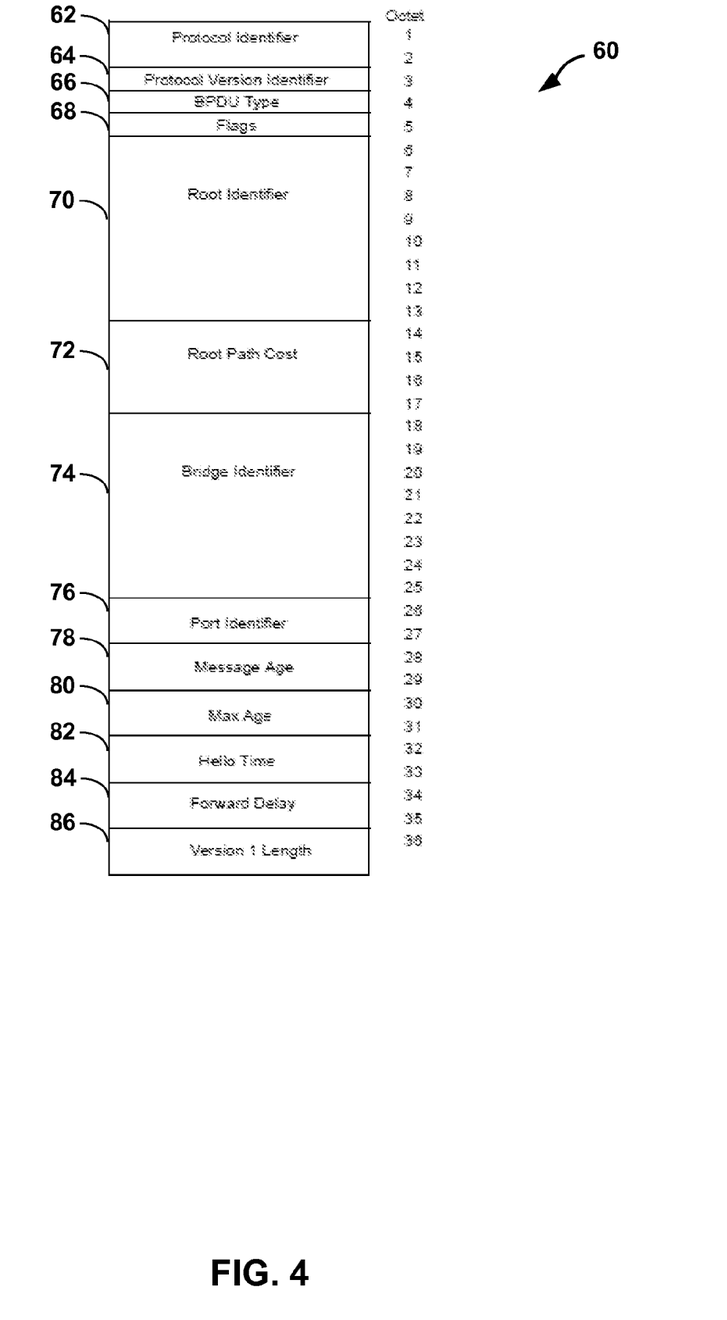
FIG. 4 is a block diagram illustrating an example bridge protocol data unit message that may be used to perform a priority vector calculation in order to implement various techniques of this disclosure.

As indicated above, a traditional "priority vector calculation" technique is used in order for a first card, e.g., line card 30A, to determine which of the Best Local Port data received from a second card and a third card within the MAC bridge, e.g., from line card 30B and line card 30C, is superior. That is, line card 30A uses a priority vector calculation to determine whether the Best Local Port data received from line card 30B is superior to the Best Local Port data received from line card 30C or whether the Best Local Port data received from line card 30B is superior to the Best Local Port data received from line card 30C. In other words, the priority vector calculation facilitates, for example, determination of a superior remote port in line unit 30A. This priority vector calculation facilitates the pre-processing aspect described above.

FIG. 4 is a block diagram illustrating an example BPDU message that may be used to perform a priority vector calculation in order to implement various techniques of this disclosure. In particular, FIG. 4 depicts the parameters and format of rapid spanning tree protocol BPDU message 60 in accordance with IEEE Standard 802.1D, the entire content of which being incorporated herein by reference. FIG. 4 depicts BPDU message 60 comprising thirteen fields and the particular octets in which each of the thirteen fields is encoded. As seen in FIG. 4, BPDU 60 comprises the following fields: protocol identifier field 62, protocol version identifier field 64, BPDU type field 66, flags field 68, root identifier field 70, root path cost field 72, bridge identifier field 74, port identifier field 76, message age field 78, maximum age field 80, hello time field 82, forward delay field 84, and version 1 length field 86. The fields of particular relevance to this disclosure were described above, including root identifier field 70, root path cost field 72, bridge identifier field 74, port identifier field 76. The remaining fields are well known to those of ordinary skill and described in detail in IEEE Standard 802.1D. As such, the remaining fields will not be described in this disclosure.

For each port on each line card of MAC bridge 22 that is receiving BPDUs, the line card's processor, e.g., processor 36, calculates a "root path priority vector." The root path priority vector for each port comprises the following five fields: root identifier 70 (as received in the BPDU), root path cost 72 (the sum of the root path cost received in the BPDU plus the receiving port's local path cost), bridge identifier 74 (as received in the BPDU), port identifier 76 (as received in the BPDU), and the receiving port identifier (this is tied to the local port number).

In accordance with techniques of this disclosure, the superior remote port is defined as the port that has the superior "root path priority vector." A processor, e.g., processor 36, a line card, e.g., line card 30, executes an algorithm for comparing the "root path priority vector" of two ports that consists of a numerical comparison of each of the five fields listed above in the order that is listed. As processor 36 compares each field, processor 36 determines a "winner" based on the lower numerical value. If a field is the same for each port, then the algorithm moves on to compare the next field in the list. In this manner, processor 36 of a line card, e.g., line card 30A, is able to determine which of the two received "Best Local Port" data from other line cards, e.g., line cards 30B and 30C, within the MAC bridge is the superior remote port and thus will be input into the line card's pseudo-port in order to determine a single superior port for the MAC bridge.

As mentioned above, the techniques of this disclosure are not limited to network devices comprising two or three line cards, but are applicable to network devices comprising more than three line cards. In a configuration in which the network device comprises N line cards, a processor on a line card simply compares the "root path priority vector" of the N-1 ports received from the other N-1 line cards. Rather than selecting a "winner" based on the lower numerical value between two ports, a processor selects a winner based on the lower numerical value between the N-1 ports. Thus, regardless of the number of line cards, a winner is chosen and input into a spanning tree computation via a pseudo-port in the manner described above.

Figure 5:
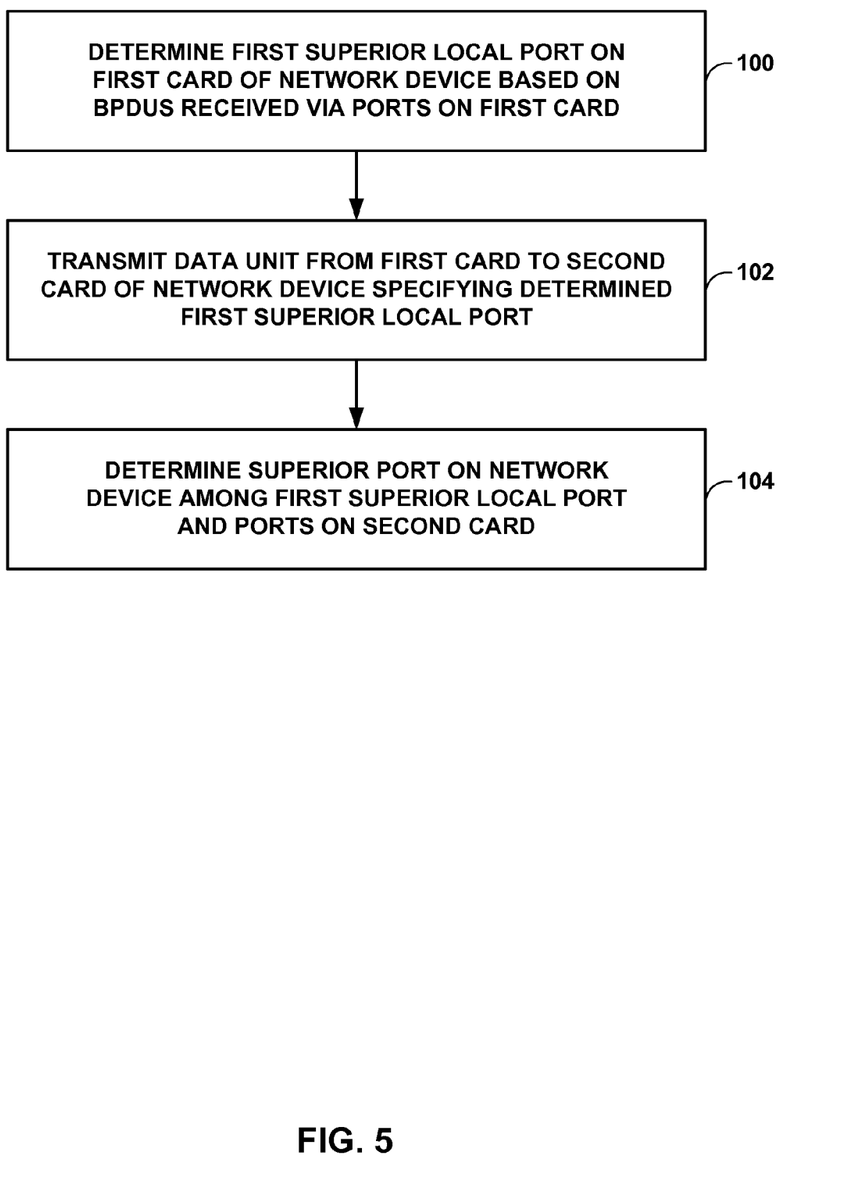
FIG. 5 is a flow chart illustrating an example method implementing various techniques of this disclosure.

FIG. 5 is a flow chart illustrating an example method implementing various techniques of this disclosure. In particular, FIG. 5 depicts an example method of determining a superior port of a network device, e.g., MAC bridge 22, comprising two line cards, e.g., line cards 30A and 30B. In the example method shown in FIG. 5, a first processor, e.g., processor 36, of a first card, e.g., line card 30A, executing a first instance of a spanning tree protocol, determines a first superior local port among a first plurality of ports, e.g., ports 1-10, on the first card based on a first plurality of BPDUs received via the first plurality of ports on the first card (100). In other words, processor 36 of line card 30A, for example, determines Best Local Port data based on the BPDUs received via its ports, e.g., ports 1-10.

After the first card, e.g., line card 30A, determines its Best Local Port, processor 36 of line card 30A of the network device, e.g., MAC bridge 22, transmits the received BPDU specifying the Best Local Port to the second card, e.g., line card 30B of the network device, e.g., MAC bridge 22. That is, the first card of the network device transmits to a second card of the network device, a data unit specifying the determined first superior local port among the first plurality of ports (102).

Upon receiving the BPDU transmitted from the first card, the second processor, e.g., processor 36, of the second card, e.g., line card 30B, executing a second instance of the spanning tree protocol, determines a superior port on the network device, e.g., MAC bridge 22, among the first superior local port and a second plurality of ports, e.g., ports 1-10, on the second card based on a second plurality of BPDUs received via the second plurality of ports (104). The determined Best Local Data (first superior local data) from line card 30A may be input via a pseudo-port into line card 30B's spanning tree computation along with the data received via each of its physical ports, e.g., ports 1-10. The second instance of the spanning tree protocol determines which of the Best Local Data and the data received via each of the second line card's physical ports is the superior port for the network device.

Although not depicted in FIG. 5, the second processor, e.g., processor 36, of the second card, e.g., line card 30B, executing the second instance of the spanning tree protocol, determines a second superior local port among a second plurality of ports, e.g., ports 1-10, on the second card based on a second plurality of BPDUs received via the second plurality of ports. In other words, processor 36 of line card 30B, for example, determines Best Local Port data based on the BPDUs received via its ports, e.g., ports 1-10.

After the second card, e.g., line card 30B, determines its Best Local Port, processor 36 of line card 30B of the network device, e.g., MAC bridge 22, transmits the received BPDU specifying the Best Local Port to the first card, e.g., line card 30A of the network device, e.g., MAC bridge 22. That is, the second card of the network device transmits to the first card of the network device, a data unit specifying the determined second superior local port among the second plurality of ports.

Upon receiving the BPDU transmitted from the second card, the first processor, e.g., processor 36, of the first card, e.g., line card 30A, executing the first instance of the spanning tree protocol, determines a superior port on the network device, e.g., MAC bridge 22, among the second superior local port and a first plurality of ports, e.g., ports 1-10, on the first card based on a first plurality of BPDUs received via the first plurality of ports. The determined Best Local Data (second superior local data) from line card 30B may be input via a pseudo-port into line card 30A's spanning tree computation along with the data received via each of its physical ports, e.g., ports 1-10. The first instance of the spanning tree protocol determines which of the Best Local Data and the data received via each of the first line card's physical ports is the superior port for the network device.

Figure 6:
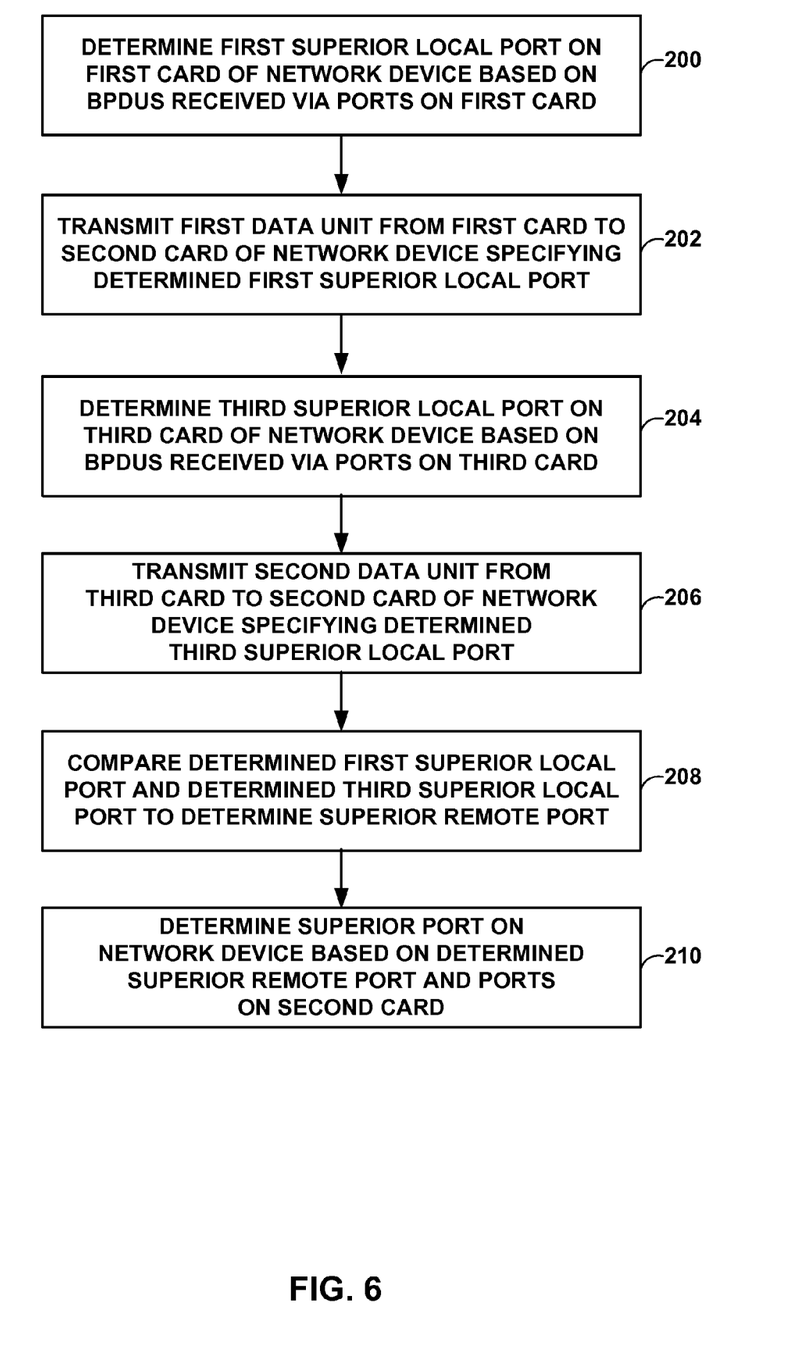
FIG. 6 is a flow chart illustrating another example method implementing various techniques of this disclosure.

FIG. 6 is a flow chart illustrating another example method implementing various techniques of this disclosure. In particular, FIG. 6 depicts an example method of determining a superior port of a network device, e.g., MAC bridge 22, comprising three or more line cards, e.g., line cards 30A-30C. The actions indicated in 200-202 of FIG. 6 are similar those described above with respect to FIG. 5 and, as such, will not be described again for conciseness. In the method shown in FIG. 6, a third processor, e.g., processor 36, of a third card, e.g., line card 30C, executing a third instance of the spanning tree protocol, determines a third superior local port among a third plurality of ports, e.g., ports 1-10, on the third card based on a third plurality of BPDUs received via the third plurality of ports (204). In other words, processor 36 of line card 30C, for example, determines Best Local Port data based on the BPDUs received via its ports, e.g., ports 1-10.

After the third card, e.g., line card 30C, determines its Best Local Port, processor 36 of line card 30C transmits the received BPDU specifying the Best Local Port to the second card, e.g., line card 30B of the network device, e.g., MAC bridge 22. That is, the third card transmits to a second card of the network device, a second data unit specifying the determined third superior local port among the third plurality of ports (206).

Upon receiving the first data unit from the first card and second data unit from the third card, the second processor on the second card, e.g., processor 36 of line card 30B, compares the determined first superior local port and the determined third superior local port to determine a superior remote port among the first card and the third card (208). In particular, processor 36 of line card 30B determines which of the determined first superior local port and the determined third superior local port is superior by executing an algorithm for comparing their "root path priority vectors" in the manner described above with respect to FIG. 4. As processor 36 compares each field, processor 36 determines a "winner" based on the lower numerical value.

By executing the second instance of the spanning tree protocol, the second processor on the second card, e.g., processor 36 of line card 30B, determines a superior port on the network device among the first card, the second card, and the third card based on the determined superior remote port and the determined second superior local port (210). In particular, the determined superior remote port, i.e., the superior Best Local Data between the first card and the third card as determined via the root path priority vector comparison, is input via a pseudo-port into line card 30B's spanning tree computation along with the determined Best Local Data (second superior local data) from line card 30B via a local or physical port on line card 30B. The second instance of the spanning tree protocol determines the superior port on the network device based on data received via each of line card 30B's physical ports and the superior Best Local Data between the first card and the third card as determined via the root path priority vector comparison.

It should be noted that FIG. 6 is described above with respect to the second line card, e.g., line card 30B. That is, the second line card receives the first data unit and the second data unit from the first and third line cards, respectively, and then the second line card performs a spanning tree computation to determine a superior port for the network device. As described in detail above with respect to FIG. 3, in order to implement the distributive techniques of this disclosure, each line card is also performing these tasks. For example, the first line card is receiving data units from the second and third line cards and determining a superior port for the network device, and the third line card is receiving data units from the first and second line cards and determining a superior port for the network device.

In some examples, the determined superior port on the network device is one of the first plurality of ports on the first card in the method shown in FIG. 5 and FIG. 6.

In other examples, the method shown in FIG. 5 and FIG. 6 further comprises assigning a first range of port identifiers to the first plurality of ports on the first card and assigning a second range of port identifiers to the second plurality of ports on the second card, wherein the first range of port identifiers is different than the second range of port identifiers.

In one example, the method shown in FIG. 5 and FIG. 6 further comprises assigning a device identifier to the first card, and assigning the device identifier to the second card. In some examples, the network device is a bridge, and the device identifier is a bridge identifier.

In another example, the method shown in FIG. 5 and FIG. 6 further comprises defining a pseudo-port on the second card, wherein the pseudo-port does not physically reside on the second card and presenting, via the pseudo-port, the data unit specifying the determined first superior local port among the first plurality of ports to the second instance of the spanning tree algorithm.

In some examples, the network device resides within an Ethernet network.

It should be noted that the various techniques described above, each individual line card operates its own instance of the spanning tree algorithm, e.g., ten line cards are operating ten instances of the spanning tree algorithm. However, techniques of this disclosure are not so limited. Rather, in some example implementations, two or more line cards within a network device may be grouped together and controlled by a single instance of the spanning tree algorithm. For example, ten line cards may be grouped in pairs of two line cards, with each pair of line cards operating a single spanning tree algorithm. In such an example, the ten line cards, grouped in pairs of two, operate five instances of the spanning tree algorithm.

The techniques described in this disclosure may be implemented, at least in part, in hardware, software, firmware or any combination thereof. For example, various aspects of the described techniques may be implemented within one or more processors, including one or more microprocessors, digital signal processors (DSPs), network processors (NPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate computing hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:
1. A method comprising:
   determining, via a first processor executing a first instance of a spanning tree protocol on a first card of a network device, a first superior local port among a first plurality of ports on the first card based on a first plurality of bridge protocol data units (BPDUs) received via the first plurality of ports;
   transmitting, from the first card to a second card of the network device via at least one of a data plane and a communications channel of the network device, a data unit specifying the determined first superior local port among the first plurality of ports;
   determining, via a second processor executing a second instance of the spanning tree protocol on the second card, a second superior local port among a second plurality of ports on the second card based on a second plurality of BPDUs received via the second plurality of ports; and
   determining, via the second processor, a superior port on the network device based on at least the determined first superior local port and the determined second superior local port.

2. The method of claim 1, wherein the determined superior port on the network device is the determined first superior local port.

3. The method of claim 1, wherein the transmitted data unit is a first data unit, the method further comprising:
   determining, via a third processor executing a third instance of the spanning tree protocol on a third card of the network device, a third superior local port among a third plurality of ports on the third card based on a third plurality of BPDUs received via the third plurality of ports; and transmitting, from the third card to the second card, a second data unit specifying the determined third superior local port among the third plurality of ports, wherein determining, via the second processor the superior port on the network device based on at least the determined first superior local port and the determined second superior local port comprises:

comparing, via the second processor, the determined first superior local port and the determined third superior local port to determine a superior remote port among the first card and the third card; and determining, via the second processor the superior port on the network device among the first card, the second card, and the third card based on the determined superior remote port and the determined second superior local port.

4. The method of claim 3, wherein comparing, via the second processor, the determined first superior local port and the determined third superior local port to determine the superior remote port among the first card and the third card comprises:

comparing a first priority vector to a second priority vector to determine the superior remote port among the first card and the third card.

5. The method of claim 1, further comprising:
assigning a first range of port identifiers to the first plurality of ports on the first card; and
assigning a second range of port identifiers to the second plurality of ports on the second card,
wherein the first range of port identifiers is different than the second range of port identifiers.

6. The method of claim 1, further comprising:
assigning a device identifier to the first card; and
assigning the device identifier to the second card.

7. The method of claim 6, wherein the network device is a bridge, and wherein the device identifier is a bridge identifier.

8. The method of claim 1, further comprising:
defining a pseudo-port on the second card, wherein the pseudo-port does not physically reside on the second card; and
presenting, via the pseudo-port, the data unit specifying the determined first superior local port among the first plurality of ports to the second instance of the spanning tree algorithm.

9. The method of claim 1, wherein the network device resides within an Ethernet network.

10. A network device comprising:
a first processor, executing a first instance of a spanning tree protocol on a first card of the network device, configured to:
determine a first superior local port among a first plurality of ports on the first card based on a first plurality of bridge protocol data units (BPDUs) received via the first plurality of ports; and
transmit, from the first card to a second card of the network device via at least one of a data plane and a communications channel of the network device, a data unit specifying the determined first superior local port among the first plurality of ports; and
a second processor, executing a second instance of the spanning tree protocol on the second card of the network device, configured to:

determine a second superior local port among a second plurality of ports on the second card based on a second plurality of BPDUs received via the second plurality of ports; and
determine a superior port on the network device based on at least the determined first superior local port and the determined second superior local port.

11. The network device of claim 10, wherein the determined superior port on the network device is the determined first superior local port.

12. The network device of claim 10, wherein the transmitted data unit is a first data unit, the device further comprising:
a third processor, executing a third instance of the spanning tree protocol on a third card of the network device, configured to:
determine a third superior local port among a third plurality of ports on the third card based on a third plurality of BPDUs received via the third plurality of ports; and
transmit, from the third card to the second card, a second data unit specifying the determined third superior local port among the third plurality of ports,
wherein the second processor configured to determine the superior port on the network device based on at least the determined first superior local port and the determined second superior port is further configured to:
compare the determined first superior local port and the determined third superior local port to determine a superior remote port among the first card and the third card; and
determine the superior port on the network device among the first card, the second card, and the third card based on the determined superior remote port and the determined second superior The local port.

13. The network device of claim 12, wherein the second processor configured to compare the determined first superior local port and the determined third superior local port to determine the superior remote port among the first card and the third card is configured to:
compare a first priority vector to a second priority vector to determine the superior remote port among the first card and the third card.

14. The network device of claim 10,
wherein the first plurality of ports on the first card comprises a first range of port identifiers,
wherein the second plurality of ports on the second card comprises a second range of port identifiers, and
wherein the first range of port identifiers is different than the second range of port identifiers.

15. The network device of claim 10,
wherein the first card comprises a device identifier, and
wherein the second card comprises the device identifier.

16. The network device of claim 15, wherein the network device is a bridge, and wherein the device identifier is a bridge identifier.

17. The network device of claim 10, further comprising:
a pseudo-port defined on the second card, wherein the pseudo-port does not physically reside on the second card,
wherein the data unit specifying the determined first superior local port among the first plurality of ports is presented, via the pseudo-port, to the second instance of the spanning tree algorithm.

18. The network device of claim 10, wherein the network device resides within an Ethernet network.

19. A non-transitory computer-readable storage medium comprising instructions that, when executed, cause:

a first processor to:
   determine, by executing a first instance of a spanning tree protocol on a first card of a network device, a first superior local port among a first plurality of ports on the first card based on a first plurality of bridge protocol data units (BPDUs) received via the first plurality of ports; and
   transmit, from the first card to a second card of the network device via at least one of a data plane and a communications channel of the network device, a data unit specifying the determined first superior local port among the first plurality of ports; and
a second processor to:
   determine, by executing a second instance of the spanning tree protocol on the second card, a second superior local port among a second plurality of ports on the second card based on a second plurality of BPDUs received via the second plurality of ports; and
   determine, by executing the second instance of the spanning tree protocol on the second card, a superior port on the network device based on at least the determined first superior local port and the determined second superior local port.

20. The non-transitory computer-readable storage medium of claim 19, wherein the determined superior port on the network device is the first superior local port.

21. The non-transitory computer-readable storage medium of claim 19, wherein the transmitted data unit is a first data unit, the computer-readable storage medium further comprising instructions that, when executed, cause:
   a third processor to:
      determine, by executing a third instance of the spanning tree protocol on a third card of the network device, a third superior local port among a third plurality of ports on the third card based on a third plurality of BPDUs received via the third plurality of ports; and
      transmit, from the third card to the second card, a second data unit specifying the determined third superior local port among the third plurality of ports,
   wherein the instructions that, when executed by the second processor to determine, by executing the second instance of the spanning tree protocol on the second card, the superior port on the network device based on at least the determined first superior local port and the determined second superior local port comprise further instructions that, when executed, cause the second processor to:
      compare the determined first superior local port and the determined third superior local port to determine a superior remote port among the first card and the third card; and
      determine, by executing the second instance of the spanning tree protocol on the second card, the superior port on the network device among the first card, the second card, and the third card based on the determined superior remote port and the determined second superior local port.

22. The non-transitory computer-readable storage medium of claim 21, wherein the instructions that, when executed, cause the second processor to compare the determined first superior local port and the determined third superior local port to determine the superior remote port among the first card and the third card comprise further instructions that, when executed, cause the second processor to:
   compare a first priority vector to a second priority vector to determine the superior remote port among the first card and the third card.

23. The non-transitory computer-readable storage medium of claim 19,
   wherein the first plurality of ports on the first card comprises a first range of port identifiers,
   wherein the second plurality of ports on the second card comprises a second range of port identifiers, and
   wherein the first range of port identifiers is different than the second range of port identifiers.

24. The non-transitory computer-readable storage medium of claim 19,
   wherein the first card comprises a device identifier, and
   wherein the second card comprises the device identifier.

25. The non-transitory computer-readable storage medium of claim 24, wherein the network device is a bridge, and wherein the device identifier is a bridge identifier.

26. The non-transitory computer-readable storage medium of claim 19, further comprising instructions that, when executed, cause the second processor to:
   present, via a pseudo-port on the second card, the data unit specifying the determined first superior local port among the first plurality of ports to the second instance of the spanning tree algorithm,
   wherein the pseudo-port does not physically reside on the second card.

27. The non-transitory computer-readable storage medium of claim 19, wherein the network device resides within an Ethernet network.

28. A network device comprising:
   means for determining a first superior local port among a first plurality of ports on a first card of a network device based on a first plurality of bridge protocol data units (BPDUs) received via the first plurality of ports;
   means for transmitting, from the first card to a second card of the network device via at least one of a data plane and a communications channel of the network device, a data unit specifying the determined first superior local port among the first plurality of ports;
   means for determining a second superior local port among a second plurality of ports on the second card based on a second plurality of BPDUs received via the second plurality of ports; and
   means for determining a superior port on the network device based on at least the determined first superior local port and the determined second superior local port.

29. The network device of claim 28, wherein the determined superior port on the network device is the first superior local port.

30. The network device of claim 28, wherein the transmitted data unit is a first data unit, the network device further comprising:
   means for determining a third superior local port among a third plurality of ports on a third card of the network device based on a third plurality of BPDUs received via the third plurality of ports; and
   means for transmitting, from the third card to the second card, a second data unit specifying the determined third superior local port among the third plurality of ports,
   wherein the means for determining the superior port on the network device based on at least the determined first superior local port and the determined second superior local port comprises:
      means for comparing the determined first superior local port and the determined third superior local port to determine a superior remote port among the first card and the third card; and
      means for determining the superior port on the network device among the first card, the second card, and the third card based on the determined superior remote port and the determined second superior local port.

31. The network device of claim 30, wherein the means for comparing comprises:
means for comparing a first priority vector to a second priority vector to determine the superior remote port among the first card and the third card.

32. The network device of claim 28, further comprising:
means for assigning a first range of port identifiers to the first plurality of ports on the first card; and
means for assigning a second range of port identifiers to the second plurality of ports on the second card,
wherein the first range of port identifiers is different than the second range of port identifiers.

33. The network device of claim 28, further comprising:
means for assigning a device identifier to the first card; and
means for assigning the device identifier to the second card.

34. The network device of claim 33, wherein the network device is a bridge, and wherein the device identifier is a bridge identifier.

35. The network device of claim 28, further comprising:
means for defining a pseudo-port on the second card, wherein the pseudo-port does not physically reside on the second card; and
means for presenting, via the pseudo-port, the data unit specifying the determined first superior local port among the first plurality of ports to the second instance of the spanning tree algorithm.

36. The network device of claim 28, wherein the network device resides within an Ethernet network.

* * * * *